United States Patent [19]

Saretzky et al.

[11] Patent Number: 4,745,990

[45] Date of Patent: May 24, 1988

[54] LUBRICANT INJECTOR AND APPARATUS FOR LUBRICATING MOVING POINTS OF LUBRICATION

[75] Inventors: Horst Saretzky, Ennepetal; Siegfried Bemba, Rommerskirchen, both of Fed. Rep. of Germany

[73] Assignee: De Limon Fluhme GmbH & Co., Düsseldorf, Fed. Rep. of Germany

[21] Appl. No.: 32,837

[22] Filed: Mar. 31, 1987

[30] Foreign Application Priority Data

Jan. 13, 1987 [DE] Fed. Rep. of Germany ....... 3700782

[51] Int. Cl.$^4$ ............................................. F16N 13/16
[52] U.S. Cl. ...................................... 184/15.2; 184/29
[58] Field of Search ........................ 184/29, 15.1, 15.2, 184/15.3

[56] References Cited

U.S. PATENT DOCUMENTS

| 2,886,134 | 5/1959 | Simmons | 184/15.1 |
| 3,135,355 | 6/1964 | Olsen et al. | 184/15.1 |
| 3,771,623 | 11/1973 | Sugawara et al. | 184/15.2 |
| 3,895,690 | 7/1975 | Thomson et al. | 184/15.2 |

FOREIGN PATENT DOCUMENTS

| 1138952 | 10/1962 | Fed. Rep. of Germany | 184/29 |
| 2352868 | 4/1975 | Fed. Rep. of Germany | 184/15.2 |

*Primary Examiner*—Leonard E. Smith
*Attorney, Agent, or Firm*—Becker & Becker, Inc.

[57] ABSTRACT

A lubricant injector and apparatus for lubricating especially chain conveyor rollers where bearings; can be refilled with lubricant via a fitting onto which the injector can be pressed. The injector has a housing inlet for receiving lubricant, and an injector tip for placement on the lubricant fitting. A spring-loaded movable piston actuated with compressed air is disposed in the housing, with the injector tip connected to the movable piston. An annular gap communicating with the inlet is provided between the housing and the movable piston having a discharge side, facing the injector tip provided with a coaxially disposed cylindrical chamber. The movable piston has a bore connecting annular gap and the cylindrical chamber. A cylindrical body control piston, disposed between the control piston and the injector tip, and for a spring-loaded feed piston that serves to transfer lubricant to the injector tip is disposed in the cylindrical chamber, with play, so that a transfer passage leads from one side of the feed piston to an opposite side thereof communicating with the injector tip. The cylindrical body is disposed in the cylindrical chamber so as to leave free a preliminary control chamber communicating with the bore in the movable piston. The cylindrical body has a channel controlled by the control piston for receiving lubricant from the preliminary control chamber, and channels communicating with the aforementioned channel and the transfer passage to effect the transfer of lubricant from the inlet to the injector tip.

11 Claims, 9 Drawing Sheets

LUBRICANT INJECTOR AND APPARATUS FOR LUBRICATING MOVING POINTS OF LUBRICATION

BACKGROUND OF THE INVENTION

1. Field of the Invention

The present invention relates to a lubricant injector for an apparatus for lubricating moving points of lubrication, especially rollers of a chain conveyer where the bearings of the rollers can be refilled with lubricant via a lubricant fitting on which the injector can be pressed during the lubricating process. The injector has a housing with an inlet for receiving lubricant and an injector tip for placement on the lubricant fitting, with a spring-loaded feed piston being disposed in the housing and serving to transfer lubricant from the inlet to the injector tip. The present invention also relates to an apparatus for lubricating moving points of lubrication, especially a central lubricating unit for rollers of a chain conveyer.

2. Description of the Prior Art

A central lubricating unit of this general type is known for lubricating the support rollers of a chain conveyer with which automobile body parts from a paint shop are introduced into a furnace for baking the paint. Due to the thermal stresses and the therewith connected evaporation of a roller bearing that is permanently filled with lubricant, it is necessary, in conformity with need, that the bearings of the supporting rollers be provided with a measured quantity of lubricant in order for the chain to rotate. For this purpose, a central nipple or fitting is provided in the roller support or on the roller pin, with this fitting supplying lubricant for the bearing to the interior of the associated roller via a transverse bore when lubricant under pressure is supplied via an injector that is placed on the fitting. The heretofore known injector of such a central lubrication unit has, in a housing, a feed piston that is actuated by compressed air and with which a predetermined amount of lubricant can be discharged via the injector tip to the lubricant fitting. A check valve is disposed in the injector tip. In the relief cycle, the piston is again moved into its rest position via a compression spring, whereby lubricant again flows to the feed piston. The drawback to this known design is that the entire injector must be moved, the feed piston is actuated with air, and the injector has a tendency to drip, since the residual lubricant that remains in the injector tip ahead of the check valve is discharged in an undesirable manner, especially because due to refilling of the injector with lubricant, the lubricant pressure is transmitted to the injector tip via the check valve, which is never completely sealed off, hence causing the residual lubricant to be discharged. In the aforementioned unit, such lubricant drops damage the quality of the paint job of the automobile body parts, and thus lead to rejection of the latter. A further drawback is that control of the lubrication process is imprecise, and in particular the timely connection of the injector with the fitting, and the positioning of these two parts, are unsatisfactory.

It is an object of the present invention, while avoiding the aforementioned drawbacks, to provide a lubricant injector as well as a lubricating apparatus, with which it is possible to precisely measure-out the discharged quantities of lubricant, without residual dripping, not only for oil but also for fluid grease, and with which the lubricating process is improved considerably, especially with regard to synchronizing the parts that are to moved together, and with regard to precisely positioning parts relative to one another.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

The lubricant injector of the present invention is characterized primarily by: a spring-loaded movable piston that is disposed in the housing and is actuated with compressed air, with the injector tip being connected to the movable piston; an annular gap that communicates with the inlet is provided between the housing and the movable piston, with the latter having a discharge side, facing the injector tip, that is provided with a coaxially disposed cylindrical chamber; the movable piston also has a bore that connects the annular gap and the cylindrical chamber; a cylindrical body for a spring-loaded control piston and the feed piston is disposed in the cylindrical chamber, with play, in such a way that a transfer passage is provided that leads from one side of the feed piston to an opposite side thereof that communicates with the injector tip, with the feed piston being disposed between the control piston and the injector tip; the cylindrical body is furthermore disposed in the cylindrical chamber in such a way as to leave free a preliminary control chamber that communicates with the bore of the movable piston; the cylindrical body also has, on that side of the feed piston remote from the injector tip, first channel means controlled by the control piston, for receiving lubricant from the preliminary control chamber, and second channel means that can communicate with the first channel means and with the transfer passage to effect the transfer of lubricant from the inlet to the injector tip.

Thus, the present invention provides a lubricant injector that, for placement on the lubricant fitting, does not have to be moved in its entirety since the injector tip is only telescopically placed on the fitting via the movable piston. The "inner" configuration of the movable piston and of the housing for discharge of the lubricant provide for precisely measured quantities of lubricant without the danger of dripping lubricant after conclusion of the pressure cycle. Due to the coaxial construction, a trouble-free flowing of the lubricant through the injector is also assured in each redirection phase, so that high counter pressures on the fitting side can also be overcome. In this connection, it is expedient that the operation and arrangement of the control piston and feed piston be actuated by lubricant pressure independently of one another, that the springs of the control piston and feed piston exert auxiliary control in the same operative direction, and that the transfer passage have an annular shape.

To provide an additional guarantee against dripping, a sealing member is preferably disposed in the discharge channel of the injector tip.

To facilitate coordination of the functions of the control piston and feed piston, as well as of the various internal lubricant redirecting, it is advantageous to close-off the cylindrical bore for the control piston relative to the cylindrical bore for the feed piston via an inserted separator. To reduce manufacturing effort and cost, the control piston and feed piston can generally be biased by equivalent springs.

Pursuant to one straightforward, expedient specific embodiment of the inventive injector, a control piston is provided between its two ends with an annular gap that is formed by a reduction of the cross-sectional area and that in the operating position establishes the connection from the preliminary control chamber to that control channel that communicates directly with one side of the feed piston, with that control channel that leads to the transfer passage being closed by the control piston. To connect the transfer passage to the other side of the feed piston, a star disk can be provided that is disposed between the cylindrical body and the injector tip, and leaves openings for redirecting the lubricant free.

The inventive apparatus for lubricating moving points of lubrication, especially a central lubricating unit for the rollers of a chain conveyer where the bearings of the rollers can be refilled with lubricant via a lubricant fitting, has a lubricant supply line, a lubricant injector having the aforementioned features that is actuated by compressed air and can be moved for pressing onto the lubricant fitting, and a control mechanism, for the lubricating process, that depends on the movements of the parts that are to be lubricated. The inventive apparatus is characterized primarily by: a carriage that is movable with the lubricant fitting and can be coupled to the movement of the latter, with the injector being disposed on the carriage; an entrainment element mounted on the carriage for contacting a part that is to be lubricated; a compressed-air cylinder that is disposed on the carriage and has a piston rod; a lever arm that operatively connects the piston rod and the entrainment element; a first control element that is tripped by a part that is to be lubricated, thereupon triggering the carriage-injector/lubricant fitting coupling by activating the compressed-air cylinder, whereupon the piston rod, via the lever arm, brings the entrainment element into a position to contact a part that is to be lubricated and thereby establishes a synchronous movement of the carriage-injector/lubricant fitting; a second control element that is triggered by the carriage for releasing a supply of air to the movable piston of the injector for pressing the injector tip onto the lubricant fitting; a third, time-delay, control member that is triggered by the carriage for activating a valve to open the lubricant supply line so that lubricant is supplied to the injector, and hence lubricant pressure is supplied to the control piston thereof for carrying out the lubricating process; a fourth control member disposed just prior to the end of the path of travel of the carriage for terminating the supply of lubricant to the injector; a further time-delay device for shutting-off the supply of air to the injector, thus terminating the supply of compressed air to the air cylinder; and at least one return spring for returning the carriage to its starting position. With the inventive lubricating apparatus, it is possible in a structurally straightforward manner to precisely couple the part that is to be lubricated with the injector over a certain length of the path of movement, and to carry out the lubricating process during this time period; it is also possible to subsequently again assume the initial position. This avoids the danger and concern about lubricant dripping onto conveyed parts, such as automobile body parts.

The control elements are advantageously in the form of light barriers or proximity switches.

Pursuant to a particularly expedient embodiment of the inventive lubricating apparatus, two injectors are disposed opposite one another. These injectors undertake the lubricating process either simultaneously or by being activated individually. For this embodiment, the piston rod of the air cylinder is connected to two oppositely disposed lever arms and entrainment elements. An impact dampening mechanism is expediently provided to limit the return movement of the carriage.

Further specific features of the present invention will be described in detail subsequently.

DESCRIPTION OF PREFERRED EMBODIMENTS

Referring now to the drawings in detail, the lubricant injector 1 essentially comprises a hollow cylindrical housing 2 in which is disposed a movable piston 4 that is actuated by compressed air and is biased by a spring 3. A step or shoulder 5 is formed in the housing 2 to support the spring 3. An appropriate step or shoulder at the left end (in the drawing) of the movable piston 4 serves as a counter abutment for the return spring 3. The back stop for the piston 4 in the path of travel is formed by a threaded plug 6 that is screwed into the end face of the housing and that has a central air inlet 7. At the opposite end face of the housing (the right end in the drawing), the movable piston 4 is connected to an injector tip 8.

An annular gap 9 is left free in the central region between the movable piston 4 and the housing 2. Via a transverse bore 11 of the movable piston 4, the annular gap 9 connects a lubricant inlet 10 formed in the housing 2 with a cylindrical chamber 12 that is coaxially formed in the movable piston 4 at the output end (the right end in the drawing). The cylindrical chamber 12 has a number of steps or shoulders, so that from the direction of the end face, a cylindrical body 13 can be placed in the chamber 12. By means of a shoulder, the cylindrical body 13 is held against a step at the back end, and at the output end the cylindrical body 13 is held by the screwed-in injector tip 8. Disposed between the injector tip 8 and the cylindrical body 13 is a star disk 14 that leaves openings free for redirecting lubricant.

The cylindrical body 13 accommodates a control piston 16 that is biased by a spring 15, and a plunger or feed piston 18 that is biased in the same operative direction by a spring 17 of the same size; the position of the piston 18 can be adjusted to alter the quantities that are to be fed or conveyed. The cylindrical body 13 is inserted with play relative to the cylindrical chamber 12 of the movable piston 4 so that an annular gap is provided to form a transfer passage 19 that leads from one side (the left side in the drawing) of the feed piston 18 to the other side thereof (the right side in the drawing). Furthermore, the cylindrical body 13 leaves free a preliminary control chamber 20 in the left end of the cylindrical chamber 12, and has channels 21 (FIG. 2) that are controlled by the control piston 16. At one end of the feed piston 18 (the left end in the drawing), further control channels 22 and 66, which can be brought into communication with the transfer passage 19, are formed in the cylindrical body 13.

A bore is provided in the center of the injector tip 8 as the lubricant discharge channel 23. The channel 23 connects the right end of the feed piston 18 with a discharge opening 24 of the injector tip 8, with this opening 24 being shaped in conformity to a conical or funnel-shaped nipple or fitting. A sealing member 25 is placed in the channel 23 and has a truncated-cone-shaped configuration which under the pressure of the lubricant releases the flow in the direction of discharge only, while sealing tightly in the opposite direction.

In the illustrated embodiment, the cylinder bore for the control piston 16 is closed-off from the cylinder bore for the feed piston 18 by an inserted separator 26. To provide a connection to the control channels 22, the control piston 16 is provided approximately in the middle with a reduced cross-sectional area that provides an annular gap 28 relative to the cylindrical body 13; this annular gap 28 represents a transfer chamber for lubricant. Finally, it should also be noted that all of the parts of the injector are sealed relative to one another by sealing rings 27, the detailed arrangement of which can be seen from the drawings.

Figure 1:
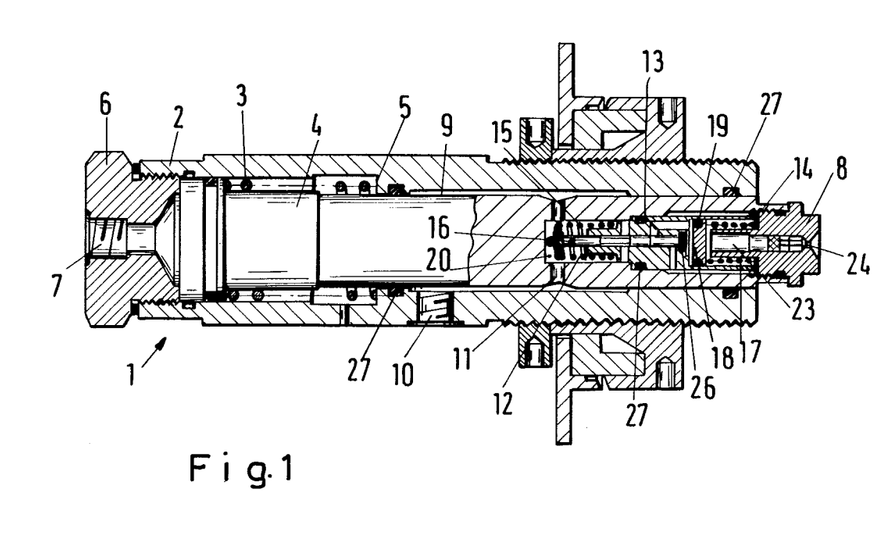
FIG. 1 is a cross-sectional view of one exemplary embodiment of the inventive lubricant injector in the initial position.
Figure 1A:
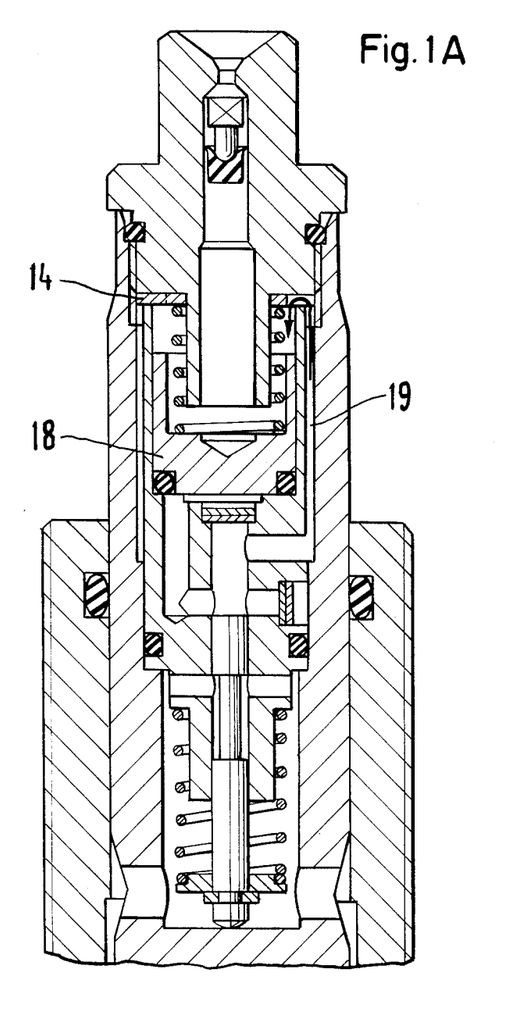
FIG. 1A is an enlarged fragmentary view of one side of the cross-sectional view of FIG. 1.

In the inoperative position illustrated in FIG. 1, in the supply line that leads, to the lubricant inlet 10 the pressure is relieved and the control piston 16 and the feed piston 18 are in their illustrated left hand position. If, in response to a control member, the movable piston 4 is supplied with compressed air via the air inlet 7, the movable piston 4 moves with the injector tip 8 into the position illustrated in FIG. 2.

Figure 2:
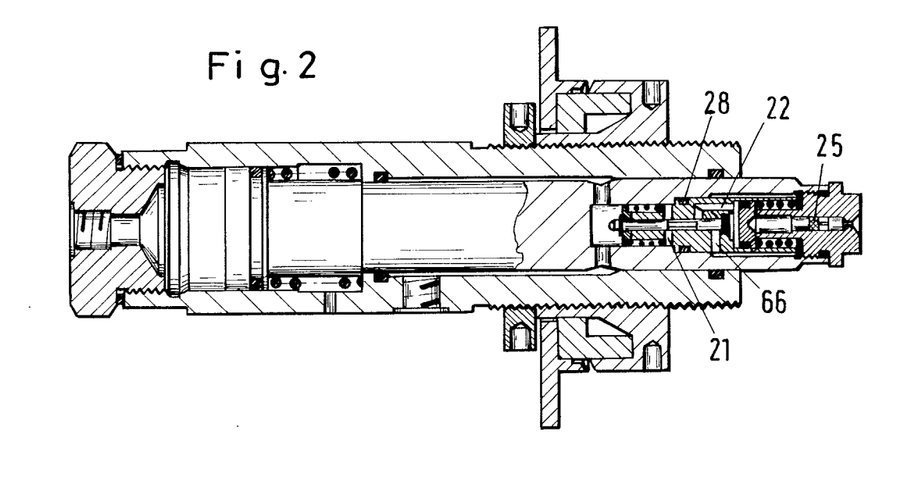
FIG. 2 is a cross-sectional view of the lubricant injector of FIG. 1 in the lubricating position (pressure cycle)

FIG. 2 shows the pressure cycle, whereby after the lubricant inlet 10 is pressurized, the pressurization is transmitted via the annular gap 9 and the transverse bores 11 in the movable piston 4 to the preliminary control chamber 20. In the pressure cycle, the control piston 16 is shifted to the right hand position illustrated in FIG. 2 against the force of the spring 15, so that lubricant from the preliminary control chamber 20 passes via the control channels 21, the annular gap 28 in the control piston 16, as well as the control channels 22 to below the feed piston 18 (the left side). The control channel 66 is closed in this position.

Under the effect of the lubricant pressure, the feed piston 18 moves to the right against the force of its spring 17 and forces the lubricant stored in front of it (the right side) through the discharge channel 23 and the discharge opening 24 into the in-place lubricating fitting as an outlet. At this point the line pressure is greater than the spring forces.

Figure 3:
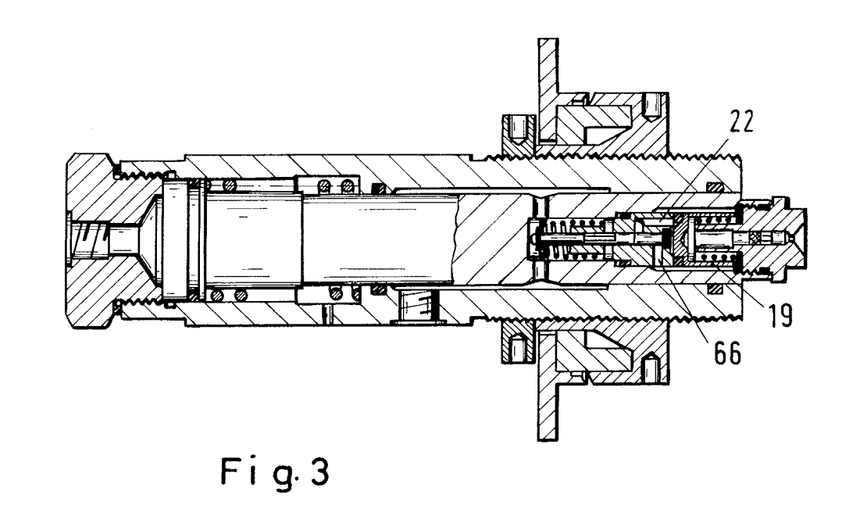
FIG. 3 is a cross-sectional view of the lubricant injector of FIG. 1 in the redirecting position (relief cycle)
Figure 4:
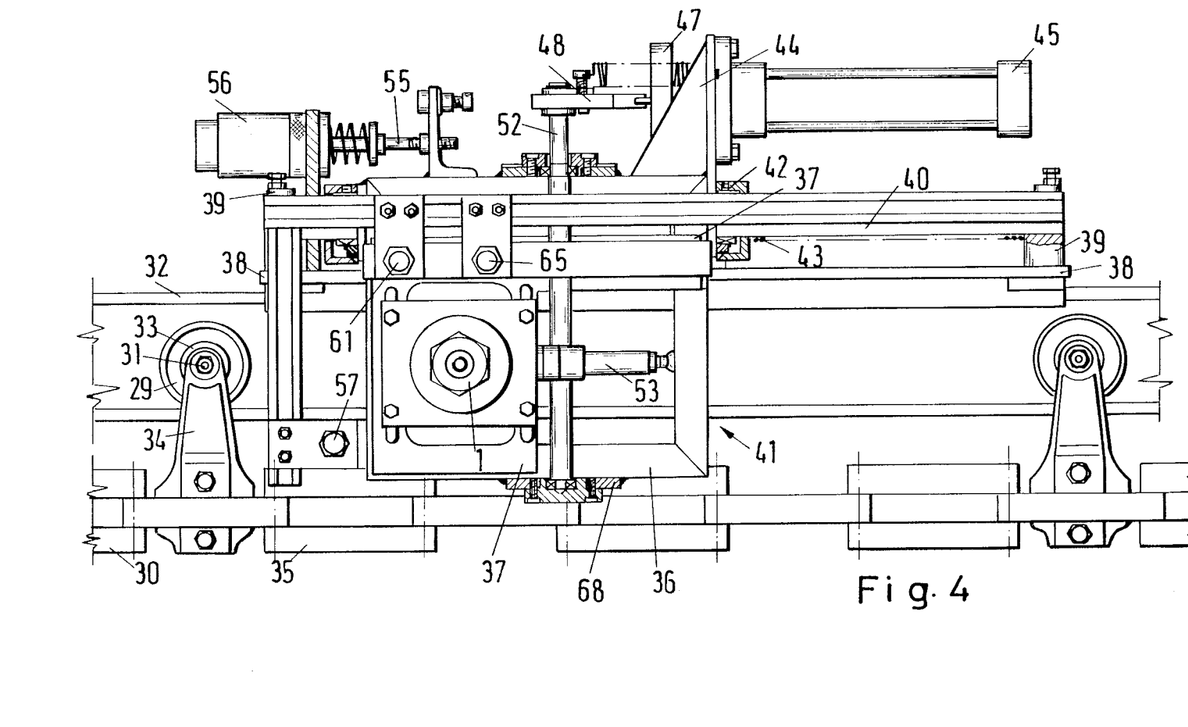
FIG. 4 is a side view of a roller-lubricating apparatus.
Figure 5:
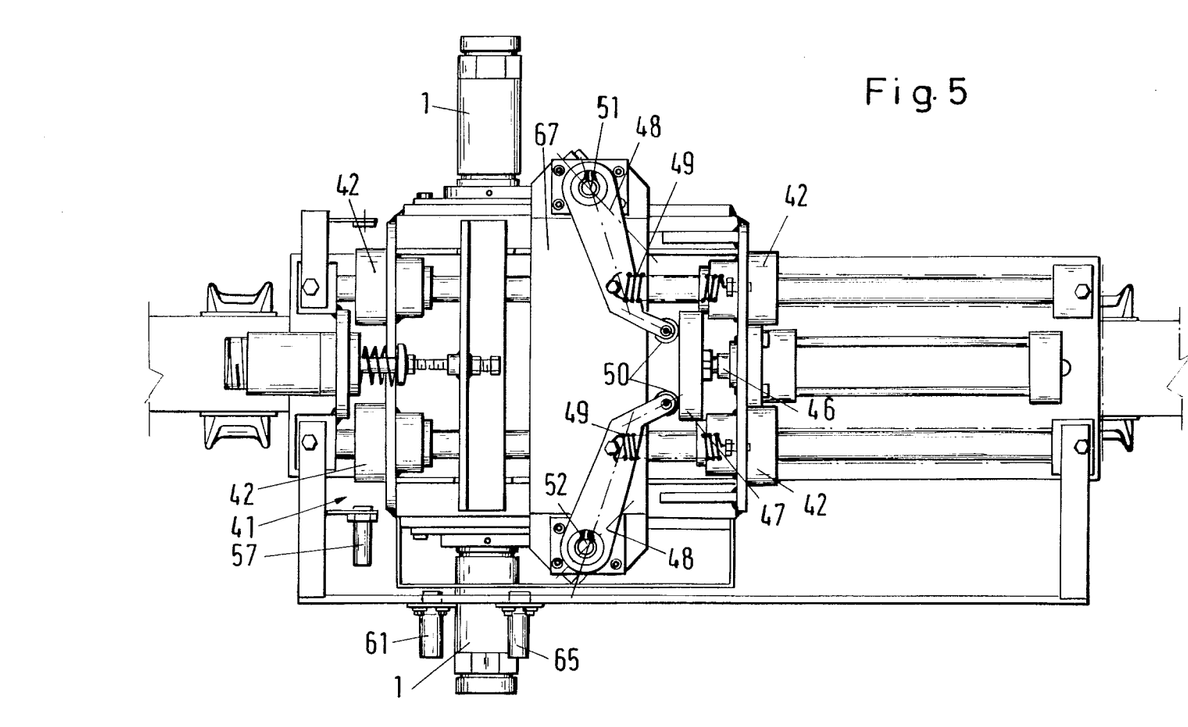
FIG. 5 is a plan view of the roller-lubricating apparatus of FIG. 4.
Figure 6:
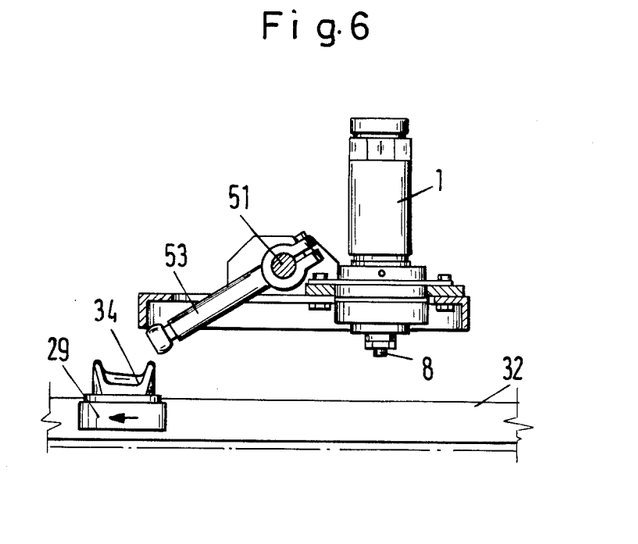
FIG. 6 is a plan view of a lubricant injector along with the entrainment element of the roller-lubricating apparatus of FIG. 4, with the entrainment element being disengaged.

When the pressure in the supply line is relieved, and hence the lubricant pressure is removed from the lubricant inlet 10, the relieved cycle representation illustrated in FIG. 3 results. The spring 15 brings the control piston 16 into the left hand position, as illustrated in FIG. 3. A sealing effect is obtained relative to the preliminary control chamber 20, so that as a consequence of the similarly initiated movement toward the left (in the drawing) of the feed piston 18 due to the effect of its spring 17, lubricant can be redirected into the space to the right, i.e. ahead of the feed piston 18, from the left side of the latter via the control channels 22 and 26, the annular transfer passage 19, and the openings in the star disk 14. After this redirection in the relieved cycle, the injector is once again ready to deliver a surge of lubricant. At approximately the same time, as shown in FIG. 3, the movable piston 4, after the supply of compressed air is shut off, is returned to its left hand starting position, in the drawing, under the effect of the spring 3.

FIGS. 4 to 8 illustrate a central lubricator for rollers 29 of a chain conveyer 30. The bearings of the rollers 29 can be refilled with lubricant via a lubricant nipple or fitting 31. For this purpose, two oppositely disposed lubricant injectors 1 of the type illustrated in FIGS. 1 to 3 are used.

The chain conveyer 30 essentially comprises a double-T beam 32 on which are disposed a plurality of spaced-apart support rollers 29. The rollers 29 are respectively mounted on a central roller pin via a bearing 33. Lubricant is supplied to the bearing 33 via the fitting 31, the roller pin, and a transverse bore. Each roller 29 carries a chain-support element 34 for a driven endless chain 35, and is also equipped to a hold a non-illustrated load hook for the material that is being supported.

Secured to the top of the double-T beam 32 is a rectangular mounting plate 38 that carries four support elements 39 to support two spaced-apart guide rods 40 that extend parallel to one another and to the double-T beam 32.

Disposed on the guide rods 40 is a carriage 41 that can be shifted axially, i.e. in the direction of the movement of the support rollers 29. The carriage 41 has a square frame 36, the elements of which are connected by holding plates 37 for two oppositely disposed injectors 1. Supported in the carriage frame 36 are four bearing supports 42 through which the guide rods 40 extend, thus enabling the axial shiftability of the entire carriage counter to the force of return compression springs 43 that are disposed on the guide rods 40.

A support bracket 44 for an air cylinder 45 is secured to the carriage frame 36, for example by being welded thereto. The piston rod 46 of the air cylinder 45 is provided with a plate 47 against which two lever arms 48 rest. The lever arms 48 are pivotable by the extended piston rod 46 of the air cylinder 45 counter to the force of a respective spring 49 disposed between the support bracket 44 and the associated lever arm 48. Small rollers 50 disposed on the free ends of the slightly bent lever arms 48 facilitates cooperation of the latter with the plate 47.

A support plate 67 on the upper portion of the carriage frame 36, as well as a correspondingly shaped support plate 68 on the lower portion of the frame, are provided with support bearings for two vertically extending shafts 51, 52 that, at the level of the injectors 1, i.e. the shafts of the support rollers 29, respectively carry a rod-like entrainment element 53, 54. When the associated lever arm 48 is pivoted, the entrainment elements 53, 54 pass into the region of movement of the rollers 29, hence establishing the positive connection roller/carriage for a common movement. The local coordination between the entrainment elements 53, 54 and the injectors 1 is such that it is possible to absolutely accurately place the injector tip 8 on the associated lubricant fitting 31 of the roller bearing that is to be lubricated.

The top of the carriage frame 36 is furthermore provided with a stop mechanism 55 that, in order to brake the return movement of the carriage 41, cooperates with an impact dampening mechanism 56 which is of the shock-absorber type and is secured to the mounting plate 38 at a corresponding level.

Figure 7:
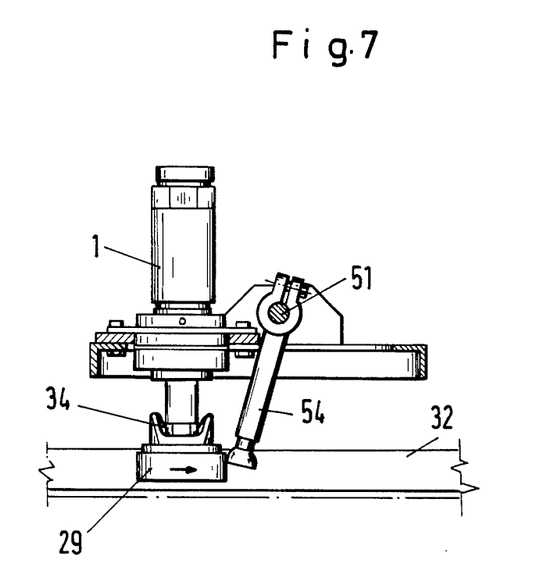
FIG. 7 is a view similar to that of FIG. 6, with the entrainment element being in engagement.
Figure 8:
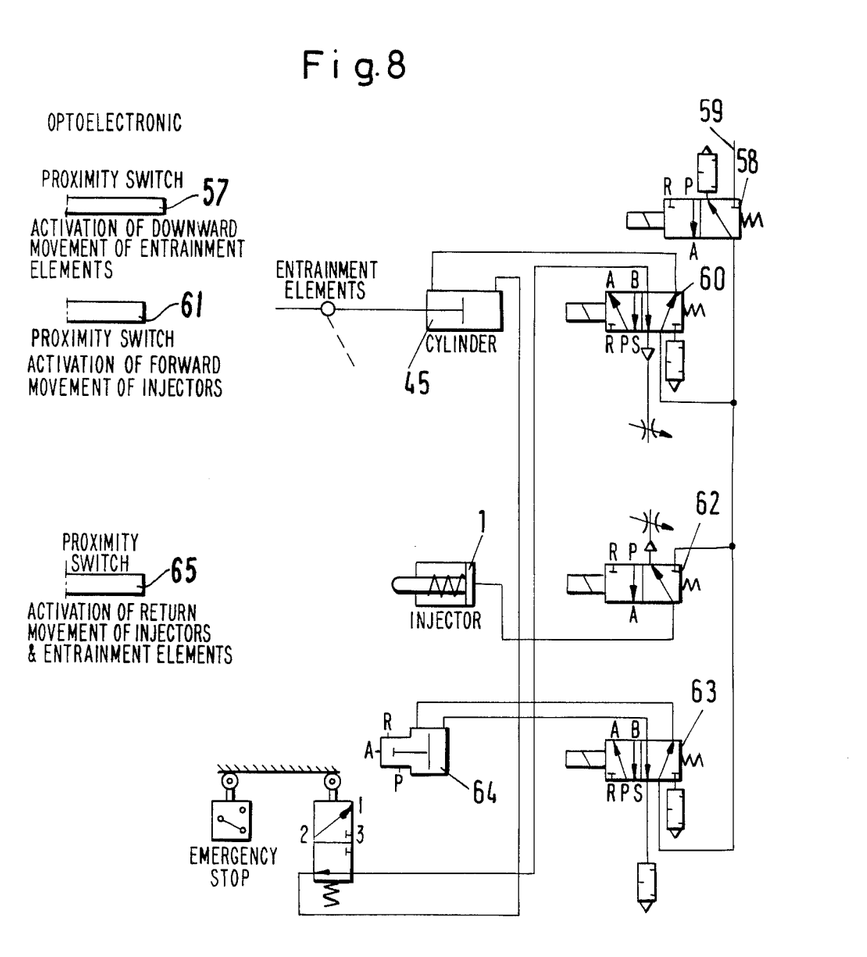
FIG. 8 shows the overall lubricating apparatus as a circuit diagram.

The operational diagram for the lubricating apparatus described above is illustrated in FIG. 8. Pursuant to this circuit diagram, the entire lubricating apparatus is activated as soon as the chain 35 of the conveyor moves. When a chain-support element 34 passes a light barrier 57 that has been positioned in conformity to the path of movement, first a 3/2-way valve 58 in a compressed air supply line 59 is set to allow through-passage, and the air cylinder 45 is supplied with compressed air via a 5/2-way valve 60. The piston rod 46 of the cylinder 45 moves to the left out of the position illustrated in FIG. 4 and hence pivots the lever arms 48 that are resting against the plate 47. In so doing, the two shafts 51, 52 rotate in such that the entrainment elements 53, 54 secured thereto pass into the path of movement of the support roller 29, as can be seen in FIG. 7. This couples the carriage 41 with the movement of the support roller 29, so that the carriage 41 is subsequently slidingly shifted to the right on the guide rods 40 out of the position illustrated in FIGS. 4 and 5.

The carriage 41 now activates a proximity switch 61 via which a 3/2-way valve 62 releases the supply of air to the movable piston 4 of each injector 1. The injector tip 8 is placed on and pressed against the respective lubricant fitting 31 of the roller 29.

A 5/2-way valve 63 is subsequently tripped, with delay, and, via a 3/2-way valve 64, releases lubricant to the lubricant inlet 10 of the injector, so that the various movements of the control piston 16 and feed piston 18 of the respective injector are activated, and lubrication of the roller bearing 33 is undertaken from both sides with a measured quantity of lubricant.

Shortly prior to conclusion of the path of travel of the carriage 41, via a further proximity switch 65 first the lubricant pressure to the injectors is shut off, and then the supply of compressed air to the injector is terminated, so that as a consequence of the force of the spring 3, the connection of the injector tip 8 with the fitting that is to be lubricated is severed. Subsequently, via a time-delay device, supply of compressed air to the air cylinder 45 is shut off, so that the carriage 41 returns to the starting position of FIGS. 4 and 5 via the return compression springs 43. The impact dampening mechanism 56 absorbs the kinetic energy.

It is to be understood that with the inventive apparatus it is possible not only to provide for lubrication on both sides (as described), but also to provide for lubrication on one side, alternating between the inner and outer roller of a chain-support element.

The present invention is, of course, in no way restricted to the specific disclosure of the specification and drawings, but also encompasses any modifications within the scope of the appended claims.

What we claim is:

1. A lubricant injector for an apparatus for lubricating moving points of lubrication, especially rollers of a chain conveyor where the bearings of the rollers can be refilled with lubricant via a lubricant fitting onto which said injector can be pressed during the lubricating process, said lubricant injector having a housing with an inlet for receiving lubricant, and an injector tip for placement on said lubricant fitting, with a spring-loaded feed piston being disposed in said housing and serving to transfer lubricant from said inlet to said injection tip; said injector further comprises:

a spring-loaded movable piston that is disposed in said housing and is actuated with compressed air, with said injector tip being connected to said movable piston; an annular gap that communicates with said lubricant inlet is provided between said housing and said movable piston, with the latter having a discharge end, facing said injector tip, that is provided with a coaxially disposed cylinder chamber; said movable piston also has a bore that connects said annular gap and said cylindrical chamber; and a cylindrical body, for a spring-loaded control piston and said feed piston, that is disposed in said cylindrical chamber, with play, in such a way that a transfer passage is provided that leads from one side of said feed piston to an opposite side thereof that communicates with said injector tip, with said feed piston being disposed between said control piston and said injector tip; said cylindrical body is furthermore disposed in said cylindrical chamber in such a way as to leave free a preliminary control chamber that communicates with said bore to establish said communication between said annular gap and said cylindrical chamber; on that side of said feed piston remote from said injector tip, said cylindrical body also has first channel means, controlled by said control piston, for receiving lubricant from said preliminary control chamber, and second channel means that can communicate with said first channel means and said transfer passage to effect said transfer of lubricant from said lubricant inlet to said injector tip.

2. A lubricant injector according to claim 1, in which said control piston and said feed piston, with respect to their operation and position, are actuated by lubricant pressure independently of one another, with the springs of said control and feed pistons providing auxiliary control for the latter in the same operative direction; and in which said transfer passage has an annular shape.

3. A lubricant injector according to claim 1, in which said injector tip is provided with a lubricant discharge channel in which is disposed a sealing member.

4. A lubricant injector according to claim 1, in which said cylindrical body is provided with a first cylindrical bore to accommodate said control piston, and a second cylindrical bore to accommodate said feed piston, with a separator being inserted to close-off said cylindrical bores relative to one another.

5. A lubricant injector according to claim 1, in which said control and feed pistons are biased by equivalent springs.

6. A lubricant injector according to claim 1, in which said control piston has two ends, somewhere between which the cross-sectional area of said control piston is reduced to form a further annular gap; and in which said second channel means includes a first channel that leads to one side of said feed piston, and a second channel that leads to said transfer passage; in an operative position of said further annular gap, the latter establishes communication between said preliminary control chamber and said one side of said feed piston via said first channel, while said control piston closes-off said second channel.

7. A lubricant injector according to claim 6, in which a star disk is disposed in said cylindrical chamber between said cylindrical body and said injector tip to establish a communication from said transfer passage to the other side of said feed piston, with said star disk leaving openings free for redirection of lubricant.

8. A lubricating apparatus for using a lubricant injector for lubricating moving points of lubrication, especially rollers of a chain conveyer where the bearings of the rollers can be refilled with lubricant via a lubricant fitting onto which said injector can be pressed during the lubricating process, said lubricant injector having a housing with an inlet for receiving lubricant, and an injector tip for placement on said lubricant fitting, with a spring-loaded feed piston being disposed in said housing and serving to transfer lubricant from said inlet to said injection tip; said injector further comprising:

- a spring-loaded movable piston that is disposed in said housing and is actuated with compressed air, with said injector tip being connected to said movable piston; an annular gap that communicates with said lubricant inlet is provided between said housing and said movable piston, with the latter having a discharge end, facing said injector tip, that is provided with a coaxially disposed cylinder chamber; said movable piston also has a bore that connects said annular gap and said cylindrical chamber;
- a cylindrical body, for a spring-loaded control piston and said feed piston, that is disposed in said cylindrical chamber, with play, in such a way that a transfer passage is provided that leads from one side of said feed piston to an opposite side thereof that communicates with said injector tip, with said feed piston being disposed between said control piston and said injector tip; said cylindrical body is furthermore disposed in said cylindrical chamber in such a way as to leave free a preliminary control chamber that communicates with said bore to establish said communication between said annular gap and said cylindrical chamber; on that side of said feed piston remote from said injector tip, said cylindrical body also has first channel means, controlled by said control piston, for receiving lubricant from said preliminary control chamber, and second channel means that can communicate with said first channel means and said transfer passage to effect said transfer of lubricant from said lubricant inlet to said injector tip;
- a lubricant supply line connected to said lubricant inlet, and a control mechanism, for the lubricating process, that operates as a function of the movement of parts that are to be lubricated; said apparatus further comprising:
- a carriage that is movable with said lubricant fitting and can be coupled to the movement of the latter, with said lubricant injector being disposed on said carriage;
- an entrainment element mounted on said carriage for contacting a part that is to be lubricated;
- a compressed-air cylinder disposed on said carriage and having a piston rod;
- a lever arm that operatively connects said piston rod and said entrainment element;
- a first control element that is tripped by a part that is to be lubricated, thereupon triggering the carriage-injector/lubricant fitting coupling by activating said air cylinder, whereupon said piston rod, via said lever arm, brings said entrainment element into a position to contact a part that is to be lubricated and thereby establish a synchronous movement of carriage-injector and lubricant fitting;
- a second control element that is triggered by said carriage for releasing a supply of air to said movable piston of said injector for pressing said injector tip onto said lubricant fitting;
- a third, time-delay, control member that is triggered by said carriage for activating a valve to open said lubricant supply line so that lubricant is supplied to said injector, and hence lubricant pressure is supplied to said control piston thereof for carrying out said lubricating process;
- a fourth control element that is disposed just prior to the end of the path of travel of said carriage for terminating the supply of lubricant to said injector;
- a further time-delay device for shutting-off the supply of air to said injector, thus terminating the supply of compressed air to said air cylinder; and
- at least one return spring for returning said carriage to its starting position.

9. A lubricating apparatus according to claim 8, in which said control elements are selected from the group consisting of proximity switches and light barriers.

10. A lubricating apparatus according to claim 9, in which two such lubricant injectors are disposed on said carriage on opposite sides thereof, with said injectors being adapted to selectively undertakes the lubricating process simultaneously or in an individually activated manner; each of said injectors has associated therewith a respective entrainment element and, between the latter and said piston rod, a respective lever arm.

11. A lubricating apparatus according to claim 8, which includes an impact dampening mechanism to limit the return movement of said carriage.

* * * * *